July 16, 1963 E. W. FERDIG 3,097,898
ANTI-FRICTION BEARING
Filed July 29, 1960
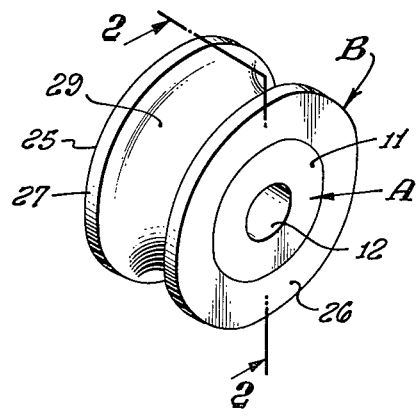
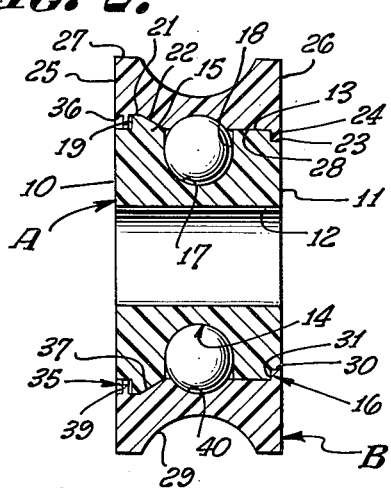
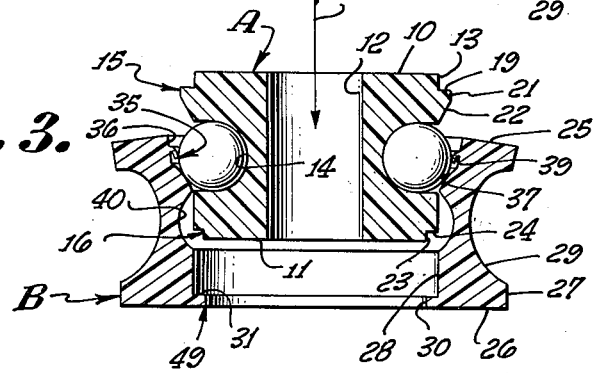
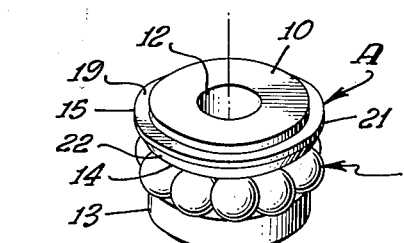
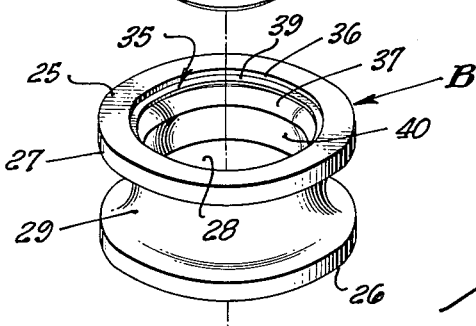
INVENTOR.
EARL W. FERDIG
BY
AGENT.

3,097,898
ANTI-FRICTION BEARING
Earl W. Ferdig, Burbank, Calif., assignor to
George F. McMurray, Glendale, Calif.
Filed July 29, 1960, Ser. No. 46,310
10 Claims. (Cl. 308—190)

This invention has to do with a roller construction and is more particularly concerned with an improved anti-friction ball bearing roller construction.

An object of my invention is to provide a ball bearing roller construction comprising two concentric ring-like parts and a row of ball bearings engaged therebetween.

Another object of my invention is to provide a roller of the character referred to wherein the ring-like parts are unitary members or parts molded of a suitable plastic material and provided with opposing concaved ball races.

A further object of the invention is to provide a structure of the character referred to wherein the said ring-like parts are provided with interengaging parts to occur at the opposite sides of the races and which serve as axial bearings and/or guides and which also serve as dust seals.

It is another object of the present invention to provide a roller of the character referred to wherein the outer ring-like member is capable of being flexed radially outwardly a limited amount to allow for engagement of the inner member and the row of balls carried by inner member into cooperating engagement therein.

An object of my invention is to provide the outer ring-like member with a radially outwardly opening groove which relieves the member to allow for flexing of said member when the roller is assembled and which subsequently serves as a rail, support or rope-receiving groove.

It is another object of my invention to provide a roller construction of the character referred to wherein the construction is assembled by the application of pressure above and does not require the use of special fastening and/or locking parts or that the parts be cemented, stacked rolled or otherwise formed and worked upon.

Another object is to provide such a construction which is not subject to becoming disassembled by ordinary use.

It is an object of the present invention to provide an improved roller construction of the character referred to which is neat, light, easy and economical to manufacture and a roller which is both highly effective and dependable in operation.

The various objects and features of my invention will be fully understood from the following detailed description of a typical preferred form and application of my invention, throughout which description reference is made to the accompanying drawings, in which:

FIG. 1 is a perspective view of a roller construction as provided by the present invention.

FIG. 2 is a detailed sectional view of my new construction taken as indicated by line 2—2 on FIG. 1.

FIG. 3 is a sectional view showing the construction in a partially assembled condition.

FIG. 4 is a view similar to FIG. 3 showing the manner in which the several parts are related and combined preparatory to assembly.

The roller construction provided by the present invention includes generally, an inner hub or ring-like member A, an outer roller or ring-like member B and an annular row of ball bearings C engaged between the hub and the roller.

The inner member or hub A is an elongate, annular ring-like member having flat, radially disposed ends 10 and 11, a central axially extending shaft receiving opening or bore 12 and a radially outwardly disposed outer wall 13.

The member A is further provided with an annular radially outwardly opening groove or ball race 14 intermediate its ends, a radially outwardly projecting enlargement or retaining flange 15 intermediate the groove 14 and the end 10 and a radially and axially outwardly opening stop flange receiving recess 16 at the end 11 thereof.

The ball race 14 is of a depth approximately three-quarters the diameter of the ball bearings, has a concaved bottom 17 corresponding in radius with the said balls and straight, radially outwardly extending sides 18.

The retaining flange 15 on the member A has a flat, axially-outwardly disposed end 19 establishing a stop shoulder or bearing surface and a radially outwardly disposed outer surface 21 of limited longitudinal extent adjacent the outer end 19 and an axially extending and radially inwardly inclined inner end 22 establishing a bearing face extending between the outer face 21 and the adjacent edge of the groove or ball race 14.

The flange 15 cooperates with the main body portion of the member A to establish what is, in effect, a radially and axially-outwardly-opening flange or retaining lip-receiving recess, as will hereinafter be described.

The flange receiving recess 16 at the end of the member A remote from the end portion of the member on which the flange 15 occurs, has a flat, radially outwardly disposed bottom 23 and a flat, axially outwardly disposed stop shoulder or bearing surface 24.

In practice, the member A is preferably molded of a suitable plastic material, such as nylon, but can, if desired, be formed of metal.

The roller or outer member B that I provide is an elongate, cylindrical member having flat, radially disposed ends 25 and 26, a radially outwardly disposed outer surface 27, and a central axially disposed bore 28.

The outer surface 27 is provided with a radially outwardly disposed groove 29 intermediate the ends of the member, which groove is adapted to relieve the wall thickness of the member and thereby allow for radial flexing of the member, as will hereinafter be described and which also serves as a receiver for a rail, support or flexible line on which or with which the roller is engaged. In practice, the groove can be of any cross-sectional configuration; for example, it can, as shown, be conical.

It is to be understood that in the event a roller having a straight outer surface is desired, it is only necessary that the wall thickness of the roller member, in the central vertical plane of the member, be such as to afford flexing of the member.

The bore 28 in the member B is of sufficient diametric extent to cooperatively receive the member A with working clearance and free rotation.

The member B is further provided with a radially inwardly projecting retaining or stop flange 49 at its end 26, which flange has a radially inwardly disposed inner face 30 and an axially-inwardly disposed, bearing surface or face 31. The flange 49 is adapted to occur in the stop flange receiving recess 16 in the member A with its faces 30 and 31 opposing the face 23 and shoulder 24 of the recess.

The flange 49 and recess 16 cooperate to stop and limit axial shifting of the member A in the member B in the direction indicated by the arrow X in FIG. 3 of the drawings and also serve as a dust seal at the end of the construction where they occur.

In addition to the foregoing, the member B is further provided with an axially outwardly opening socket 35 entering its end remote from the flange 49 and concentric with the bore 28 and in which the retaining flange 15 on the member A is cooperatively engaged. The socket 35 has a straight, cylindrical bore 36 of limited longitudinal extent adjacent the end 25 of the member, and an axially inwardly and radially inwardly inclined bottom 37 establishing a bearing surface and continuing inwardly from the bore.

A radially inwardly projecting, flexible retaining flange or lip 39 is provided in the bore of the socket.

The element B is also provided with a radially inwardly opening, concaved ball race or groove 40 intermediate its ends, which groove has a radius equal to the radius of the ball bearings and which is of a depth equal to approximately one-quarter the diameter of the balls. The race 40 and the groove 29 in the member B occur in the same radial plane so that they cooperate to establish a thin or relieved flexing portion in the member.

When the member B is fully engaged in the member A, as shown in FIG. 2 of the drawings, the surfaces 21 and 22 on the retaining flange 15 oppose the surfacing 36 and 37 in the socket 35, respectively, and the retaining flange or lip 39 overlies or occurs adjacent the end surface 19 of the retaining flange 15.

With the above relationship of parts, it will be apparent that the retaining flange, socket and retaining lip cooperate to guide and maintain the members A and B in proper radial alignment, prevent axial displacement and also serve as a dust seal at the end of the construction at which they occur.

In assembling the construction that I provide the row of ball bearings C are arranged in the race 14 in the member A. The race 14 being but approximately three-quarters the diameter of the balls, a quarter of the balls project radially outwardly from the outer surface 13 of the member A.

With the balls C thus engaged in the member A, the end portion 11 of the member A is introduced into the bore 28 of the member B from its end 25 and until the outwardly projecting portions of the balls C enter the socket 35 and engage the retaining lip 39. Since the several balls only establish point contact about the lip, sufficient quarter is provided between the balls to permit the lip to flex and pass the balls, upon the application of suitable pressure.

The balls C next engage the inclined bottom surface 37 in the socket 35. Upon the further application of pressure and by virtue of the mechanical principle of the inclined plane afforded by the inclined surface 37 and the radius of the balls and also by virtue of the fact that the element B is relieved by the grooves 29 and/or 40, the end portion of the element B in which the socket 35 occurs is flexed radially outwardly. Upon continued application of pressure, and continued flexing of the member B, the member is flexed sufficiently to allow advancing of the balls through the bore 28 in the member B and thence into engagement in the groove or race 40, whereupon the member B returns to its original form and in complete assembled condition, as shown in FIG. 2 of the drawings.

It is to be noted that when the member B is flexed in the manner shown and described, the retaining lip 39 is drawn radially outwardly so as to pass or allow for shifting of the retaining flange thereby and that when the member is released so that it assumes its normal configuration, the lip occurs adjacent the outer end 19 of the flange 15.

It will be further noted that with the relationship between the lip 39 and flange 15 that I provide, if the member B is urged axially relative to the member A so as to urge the flange 15 out of the socket 35, the lip 39 is placed in direct shear and there are no inclined surfaces which will start the necessary flexing of the member B to urge the lip out of the path of the flange 15. Accordingly, the member A cannot be urged out of engagement in the member B without applying such pressure as will result in shearing off or causing cold flow of the retaining lip 39.

Axial shifting of the member A through the member B in the direction indicated by the arrow X in FIG. 3 of the drawings is positively prevented by the opposing radially disposed surfaces 24—31 and the opposing inclined surfaces 22—37 of the members A and B.

It will be apparent that, in practice, the several parts and/or portions of the members A and B which make possible the flexing of the member B so as to allow for assembling of the construction could be rearranged so that the inner or hub member A is flexed radially inwardly instead of the outer race member being flexed radially outwardly. In such a case, the race in the member B would be the major or deepest race and the race in the hub A would be the inner or shallowest race. The retaining enlargement or flange with its inclined surface would be on the outer member B and the member A would have a reduced end portion with an inclined surface and a retaining lip to cooperate with the retaining flange.

Since a mere reversal of the structure illustrated in the drawings and suggested above is obvious and apparent, further description of such an obvious modification and figures in the drawings to illustrate such a modification will be dispensed with.

Further, it will be apparent that, if desired, the interengaging parts at the ends of the members and which serve as guiding means and as dust seals could be eliminated. Such a structure would be satisfactory for use where only light axial forces are encountered and where dust and the like are not encountered.

Still further, in practice, the races in both the inner and outer members could serve to relieve each of the members so that they will each flex when the structure is assembled. With such an arrangement, heavier wall thickness can be maintained in one or both of the members.

Having described only a typical preferred form and application of my invention, I do not wish to be limited or restricted to the specific details herein set forth, but wish to reserve to myself any modifications or variations that may appear to those skilled in the art and fall within the scope of the following claims.

Having described my invention, I claim:

1. A ball bearing roller construction of the character referred to including, an elongate hub member having axially disposed ends, a cylindrical outer surface, a radially outwardly opening concaved ball race intermediate its ends, a radially and axially outwardly opening stop flange receiving recess at one end and a radially outwardly projecting retaining flange at its other end, an elongate roller member having axially disposed ends, a cylindrical outer surface, a central bore, a radially inwardly opening concaved race opposing the race in the hub member, a radially inwardly projecting stop flange at one end and an axially outwardly opening retaining flange receiving socket opening at the other end, and an annular row of balls engaged between the members and in the races, said stop and retaining flanges extending into the stop and retainer flange receiving recess and socket, respectively, said outer race member being formed of resilient material, said race in the outer member relieving the section whereby one end of the section will flex radially outwardly to receive the balls when the inner member with the balls engaged in the race therein is shifted axially into engagement in the outer member.

2. A ball bearing roller construction of the character referred to including, an elongate hub member having axially disposed ends, a cylindrical outer surface, a radially outwardly opening concaved ball race intermediate its ends, a radially and axially outwardly opening stop flange receiving recess at one end and a radially outwardly projecting retaining flange at its other end, an elongate roller member having axially disposed ends, a cylindrical outer surface, a central bore, a radially outwardly opening work engaging groove in the outer surface intermediate the ends, a radially inwardly opening concaved race intermediate the ends opposing the race in the hub member, a radially inwardly projecting stop flange at one end and an axially outwardly opening retaining flange receiving socket opening at the other end, and an annular row of balls engaged between the members and in the races, said stop and retaining flanges extending into the stop and retainer flange receiving recess and socket, respectively, said outer race member being formed of resilient material, said groove and race in the outer member relieving the central portion of the section whereby one end of the section will flex radially outwardly to receive the balls when the inner member with the balls engaged in the race therein is shifted axially into engagement in the outer member.

3. A ball bearing roller construction of the character referred to including, an elongate hub member having axially disposed ends, a cylindrical outer surface, a radially outwardly opening concaved ball race intermediate its ends, a radially and axially outwardly opening stop flange receiving recess at one end and a radially outwardly projecting retaining flange with a longitudinally and radially inwardly inclined surface at its other end, an elongate roller member having axially disposed ends, a cylindrical outer surface, a central bore, a radially inwardly opening concaved race opposing the race in the hub member, a radially inwardly projecting stop flange at one end and an axially outwardly opening retaining flange receiving socket opening with a straight axial bore at the other end, and a radially inwardly inclined bottom bearing surface extending between the bore and the adjacent edge of the ball race, and an annular row of balls engaged between the members and in the races, said stop and retaining flanges extending into the stop and retaining flange receiving recess and socket, respectively, said outer race member being formed of resilient material, said race in the outer member relieving the section whereby one end of the section will flex radially outwardly to receive the balls when the inner member with the balls engaged in the race therein is shifted axially into engagement in the outer member.

4. A ball bearing roller construction of the character referred to including, an elongate hub member having axially disposed ends, a cylindrical outer surface, a radially outwardly opening concaved ball race intermediate its ends, a radially and axially outwardly opening stop flange receiving recess at one end and a radially outwardly projecting retaining flange at its other end, an elongate roller member having axially disposed ends, a cylindrical outer surface, a central bore, a radially inwardly opening concaved race opposing the race in the hub member, a radially inwardly projecting stop flange at one end and an axially outwardly opening retaining flange receiving socket opening at the other end, a radially inwardly extending flexible retaining lip in the socket opening to occur axially outward of and engage the retaining flange, and an annular row of balls engaged between the members and in the races, said stop and retaining flanges extending into the stop and retainer flange receiving recess and socket, respectively, said outer race member being formed of resilient material, said race in the outer member relieving the section whereby one end of the section will flex radially outwardly to receive the balls when the inner member with the balls engaged in the race therein is shifted axially into engagement in the outer member.

5. A ball bearing roller construction of the character referred to including, an elongate hub member having axially disposed ends, a cylindrical outer surface, a radially outwardly opening concaved ball race intermediate its ends, a radially and axially outwardly opening stop flange receiving recess at one end and a radially outwardly projecting retaining flange with a longitudinally and radially inwardly inclined surface at its other end, an elongate roller member having axially disposed ends, a cylindrical outer surface, a central bore, a radially outwardly opening work engaging groove in the outer surface intermediate the ends, a radially inwardly opening concaved race intermediate the ends, opposing the race in the hub member, a radially inwardly projecting stop flange at one end and an axially outwardly opening retaining flange receiving socket opening with a straight axial bore at the other end and a longitudinally and radially inwardly inclined bottom bearing surface extending between the bore and the adjacent edge of the race, and an annular row of balls engaged between the members and in the races, said stop and retaining flanges extending into the stop and retainer flange receiving recess and socket, respectively, said outer race member being formed of resilient material, said groove and race in the outer member relieving the central portion of the section whereby one end of the section will flex radially outwardly to receive the balls when the inner member with the balls engaged in the race therein is shifted axially into engagement in the outer member.

6. A ball bearing roller construction of the character referred to including, an elongate hub member having axially disposed ends, a cylindrical outer surface, a radially outwardly opening concaved ball race intermediate its ends, a radially and axially outwardly opening stop flange receiving recess at one end and a radially outwardly projecting retaining flange with a longitudinally and radially inwardly inclined surface at its other end, an elongate roller member having axially disposed ends, a cylindrical outer surface, a central bore, a radially inwardly opening concaved race opposing the race in the hub member, a radially inwardly projecting stop flange at one end and an axially outwardly opening retaining flange receiving socket opening with a straight axial bore at the other end, and a radially inwardly inclined bottom bearing surface extending between the bore and the adjacent edge of the ball race, a radially inwardly extending flexible retaining lip in the socket opening to occur axially outward of the retaining flange, and an annular row of balls engaged between the members and in the races, said stop and retaining flanges extending into the stop and retaining flange receiving recess and socket, respectively, said outer race member being formed of resilient material, said race in the outer member relieving the section whereby one end of the section will flex radially outwardly to receive the balls when the inner member with the balls engaged in the race therein is shifted axially into engagement in the outer member.

7. A ball bearing roller construction of the character referred to including, an elongate hub member having axially disposed ends, a cylindrical outer surface, a radially outwardly opening concaved ball race intermediate its ends, a radially and axially outwardly opening stop flange receiving recess at one end and a radially outwardly projecting retaining flange with a longitudinally and radially inwardly inclined surface at its other end, an elongate roller member having axially disposed ends, a cylindrical outer surface, a central bore, a radially outwardly opening work engaging groove in the outer surface intermediate the ends, a radially inwardly opening concaved race intermediate the ends opposing the race in the hub member, a radially inwardly projecting stop flange at one end and an axially outwardly opening retaining flange receiving socket opening with a straight axial bore at the other end, and a longitudinally and radially inwardly inclined bottom bearing surface, a radially inwardly extending flexible retaining lip in the socket opening to occur axially outward of the retaining flange, and an annular row of balls engaged between the members and in the races, said stop and retaining flanges extending into the stop and retainer flange receiving recess and socket, respectively, said outer race member being formed of resilient material, said groove and race in the outer member relieving the central portion of the section whereby one end of the section will flex radially outwardly to receive the balls when the inner member with the balls engaged in the race therein is shifted axially into engagement in the outer member.

8. A ball bearing roller construction of the character referred to including, a central cylindrical hub member having a radially-outwardly-disposed outer surface with a radially-outwardly-opening concave ball race intermediate its ends, and annular axially-outwardly-disposed bearing surfaces at its ends; an outer cylindrical roller member about the hub member having axially-disposed ends, a cylindrical outer surface, a cylindrical bore, a radially-outwardly-opening relief and work-engaging groove in the outer surface intermediate its ends, a radially-inwardly-disposed ball race intermediate its ends and opposing the race in the hub member, radially-inwardly-projecting stop flanges at each end of the outer member and overlying the adjacent annular bearing surfaces on the hub member, and an annular row of balls engaged between the members and with the races, said outer roller member and stop flanges being formed of resilient material, said groove in the outer member relieving the central portion of the member whereby one end portion thereof will flex radially outwardly relative to the other end portion thereof to receive the balls when the inner member with the balls engaged in the race therein is shifted axially by the related flange and into engagement in the outer member.

9. A ball bearing roller construction of the character referred to including a central cylindrical hub member having a radially-outwardly-disposed outer surface with a radially-outwardly-opening concave ball race intermediate its ends and an axially and radially-outwardly-opening stop flange receiving recess at each end; an outer cylindrical roller member about the hub member having axially disposed ends, a central longitudinal bore, a radially-outwardly-opening groove intermediate its ends to relieve the central portion of the member and to cooperatively receive a support member, a radially-inwardly-disposed ball race opposing the race in the hub member, and radially-inwardly-projecting annular retaining flanges at the ends of the roller member and extending into said recesses in the hub member, an annular row of ball bearings carried by the race in the inner member to project radially outwardly therefrom and bearing on said race of the outer member, said outer member being formed of flexible material and at least one of said flanges being thin and flexible whereby said flange will yield and the adjacent end portion of the outer member will flex radially outwardly from the central relief portion thereof when said inner member and ball assembly is urged axially into engagement in the outer member.

10. A ball bearing roller construction as set forth in claim 9, wherein said race in the inner member is greater in depth than the radial extent of the ball bearings whereby the balls project radially outwardly from the outer periphery of the hub member a limited extent and flexing of the outer member is maintained at a minimum upon assembly of the construction.

References Cited in the file of this patent
UNITED STATES PATENTS

| 942,392 | Koch | Dec. 7, 1909 |
| 1,348,758 | Spitzfaden | Aug. 3, 1920 |
| 2,230,744 | Disbro | Feb. 4, 1941 |
| 2,416,197 | Moyer et al. | Feb. 18, 1947 |
| 2,760,378 | Van Deventer | Aug. 28, 1956 |
| 3,034,839 | Schoos | May 15, 1962 |

FOREIGN PATENTS

| 730,426 | Great Britain | May 25, 1955 |